United States Patent
Gaccione

(10) Patent No.: US 11,570,953 B1
(45) Date of Patent: Feb. 7, 2023

(54) ENCLOSED GARDEN BED SYSTEM

(71) Applicant: Deana N. Gaccione, Queen Creek, AZ (US)

(72) Inventor: Deana N. Gaccione, Queen Creek, AZ (US)

(*) Notice: Subject to any disclaimer, the term of this patent is extended or adjusted under 35 U.S.C. 154(b) by 0 days.

(21) Appl. No.: 17/106,873

(22) Filed: Nov. 30, 2020

(51) Int. Cl.
  *A01G 9/28* (2018.01)
  *A01G 13/10* (2006.01)

(52) U.S. Cl.
  CPC .............. *A01G 9/28* (2018.02); *A01G 13/10* (2013.01)

(58) Field of Classification Search
  CPC . A01G 9/20; A01G 9/28; A01G 13/10; A01G 9/02; A01G 2009/1453; A01G 13/02; A01G 13/0206; A01G 13/0212
  See application file for complete search history.

(56) References Cited

U.S. PATENT DOCUMENTS

| | | | | |
|---|---|---|---|---|
| 5,456,043 | A * | 10/1995 | Dacon | A01G 13/02 47/21 |
| 10,660,276 | B1 * | 5/2020 | Harris | A01G 13/02 |
| 2010/0218421 | A1 * | 9/2010 | Monnes | A01G 13/02 47/29.5 |
| 2010/0320110 | A1 * | 12/2010 | Dougherty | B65D 85/52 206/423 |
| 2014/0190077 | A1 | 7/2014 | Burmann | |
| 2017/0238473 | A1 * | 8/2017 | Schroeder | A01G 9/02 |
| 2017/0280635 | A1 | 10/2017 | Petty | |
| 2019/0029190 | A1 * | 1/2019 | Masri | A01G 13/04 |
| 2019/0053440 | A1 * | 2/2019 | Lysak | A01G 13/02 |
| 2021/0076574 | A1 * | 3/2021 | Reiger | A01G 9/02 |

FOREIGN PATENT DOCUMENTS

| | | |
|---|---|---|
| CN | 104920127 A | 9/2015 |
| CN | 106804344 A | 6/2017 |
| CN | 206260592 U | 6/2017 |
| CN | 207460932 U | 6/2018 |
| CN | 111345176 A | 6/2020 |
| GB | 2383513 A | 7/2003 |
| GB | 2388511 A | 11/2003 |
| KR | 20030072514 A | 9/2003 |

OTHER PUBLICATIONS

4'X 16' Feet Trellis Netting 6"X 6" Mesh Square Scrog Plant Support Bay Hydro, Source: https://www.ebay.com/itm/4-x-16-FEET-Trellis-Netting-6-x-6-Mesh-Square-SCROG-Plant-Support-BAY-HYDRO-/321419028839 Date Accessed: Dec. 2, 2020.

* cited by examiner

*Primary Examiner* — Joshua J Michener
*Assistant Examiner* — Henry Hooper Mudd
(74) *Attorney, Agent, or Firm* — Booth Udall Fuller, PLC

(57) ABSTRACT

An enclosed garden bed system comprising a garden bed framework, a container, a net enclosure framework, and a netting material. The garden bed framework has a plurality of members joined together by a plurality of member connectors, and sits inside of the container. The container is made of a breathable non-woven fabric and has a plurality of sleeves. The top members of the garden bed framework extend through the plurality of sleeves. The net enclosure framework is coupled to the top of the garden bed framework and also has a plurality of members joined together by a plurality of member connectors. The netting material wraps around and over a portion of the net enclosure framework and protects plants within the container. Each of the lower corners of the netting material comprises an elastic material configured to stretch when the netting material is placed over the net enclosure framework.

17 Claims, 8 Drawing Sheets

ENCLOSED GARDEN BED SYSTEM

TECHNICAL FIELD

Aspects of this document relate generally to an enclosed garden bed system, and more specifically to an enclosed garden bed system with a framework and a netting material enclosing the system.

BACKGROUND

Successful gardening must overcome a variety of challenges. Setting aside providing for basic needs of the plants, such as sunlight, water, and nutrients, a gardener must also protect plants from pests, extreme temperatures, and excessive sunlight. To facilitate protecting plants in this way, what is needed is a framework capable of supporting protective materials around the garden bed.

SUMMARY

Aspects of this document relate to an enclosed garden bed system that may include a garden bed framework having a first plurality of members joined together by a first plurality of member connectors, each of the first plurality of member connectors forming a corner of the garden bed framework. The first plurality of members may have four top members connected by top corners on a top of the garden bed framework, four vertical support members around a side of the garden bed framework, and four bottom members on a bottom of the garden bed framework. The garden bed framework may also have a cubic shape. A container may also be included having a base and four sides, each of the four sides having a top edge with a sleeve configured to receive a member. The garden bed framework may sit inside of the container with each of the top members extending through one of the sleeves. The container may be made of a breathable non-woven fabric. A net enclosure framework may be coupled to the top of the garden bed framework and may have a second plurality of members joined together by a second plurality of member connectors, each of the second plurality of member connectors forming a corner of the net enclosure framework. A horizontal cross-sectional shape of the net enclosure framework may match a horizontal cross-sectional shape of the garden bed framework. Finally, a netting material may be wrapped around and over a portion of the net enclosure framework. The netting material may include polyethylene and may be configured to protect plants planted within the container. The netting material may have a plurality of lower corners along a lower edge of the netting material adjacent the top corners of the garden bed framework. Each of the lower corners may include an elastic material configured to stretch when the netting material may be placed over the net enclosure framework.

Particular embodiments may comprise one or more of the following features.

The netting material may be configured to deter pests from entering into the enclosed garden bed system.

The netting material may be a shade cover configured to protect the plants from the sun.

Aspects of this document relate to an enclosed garden bed system that may include a garden bed framework having a first plurality of members joined together by a first plurality of member connectors. The first plurality of members may include a plurality of top members on a top of the garden bed framework and a plurality of vertical support members around a side of the garden bed framework. A container may have a base and a plurality of sides, each of the plurality of sides having a top edge with a sleeve configured to receive a member. The garden bed framework may sit inside of the container with each of the top members extending through one of the sleeves. A net enclosure framework may be coupled to the top of the garden bed framework and may have a second plurality of members joined together by a second plurality of member connectors to form an enclosure. A netting material may be wrapped around and over a portion of the net enclosure framework. The netting material may have a plurality of lower corners adjacent the plurality of top members of the garden bed framework. The plurality of lower corners may include an elastic material configured to stretch when the netting material is placed over the net enclosure framework.

Particular embodiments may comprise one or more of the following features.

The garden bed framework may have a cubic shape.

The container may be made of a breathable non-woven fabric.

A strip may also be included that extends horizontally between each of the lower corners of the netting material adjacent the top edges of the container, such that the strip overlaps with the netting material and the top edges of the container.

The netting material may include a plurality of panels sewn together with at least one rope. The rope may be a nylon material. The rope may be a polyethylene material.

The netting material may be configured to deter pests from entering into the enclosed garden bed system.

The netting material may be a shade cover configured to protect a plant within the enclosed garden bed system from the sun.

The netting material may be a frost protection cover configured to protect a plant within the enclosed garden bed system from frost.

Aspects of this document relate to an enclosed garden bed system that may include a net enclosure framework having a plurality of members joined together by a plurality of member connectors to form an enclosure. A netting material may be wrapped around and over a portion of the net enclosure framework. The netting material may have a plurality of lower edges and a plurality of lower corners. The plurality of lower edges each may have a fastener configured to couple the plurality of lower edges to the net enclosure framework and the plurality of lower corners each may have an elastic material configured to stretch when the netting material may be placed over the net enclosure framework.

Particular embodiments may comprise one or more of the following features.

The fastener may be a hook and loop material and each of the plurality of lower edges couples to the net enclosure framework by wrapping around a member of the plurality of members.

The netting material may be a UV resistant material.

The netting material may include a plurality of panels sewn together with at least one rope.

The netting material may be configured to deter pests from entering into the enclosed garden bed system.

The netting material may be a shade cover configured to protect a plant within the enclosed garden bed system from the sun.

The netting material may be a frost protection cover configured to protect a plant within the enclosed garden bed system from frost.

The foregoing and other aspects, features, applications, and advantages will be apparent to those of ordinary skill in the art from the specification, drawings, and the claims. Unless specifically noted, it is intended that the words and phrases in the specification and the claims be given their plain, ordinary, and accustomed meaning to those of ordinary skill in the applicable arts. The inventors are fully aware that he can be his own lexicographer if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those of ordinary skill in the art from the specification, drawings, and the claims.

BRIEF DESCRIPTION OF THE DRAWINGS

Implementations will hereinafter be described in conjunction with the appended drawings, where like designations denote like elements, and.

Figure 1:
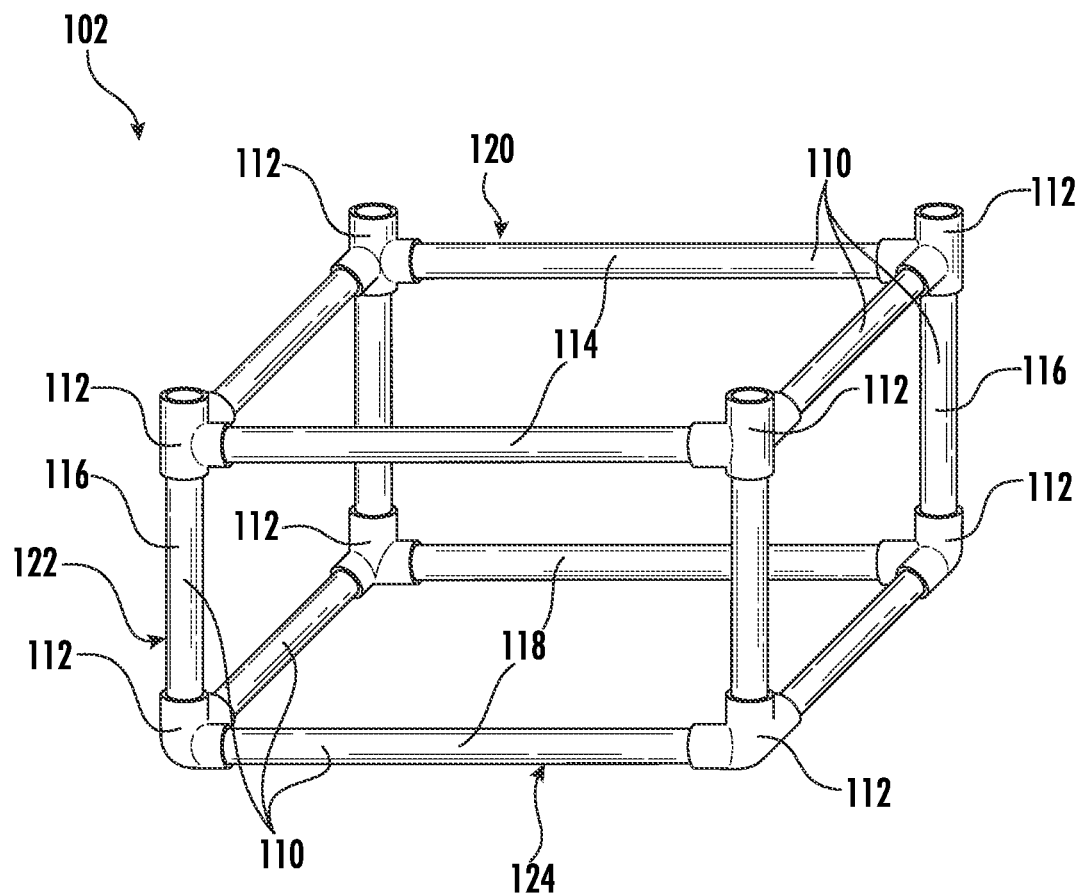
FIG. 1 is a perspective view of an embodiment of the garden bed framework.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of implementations that are described in many different forms, there is shown in the drawings and will herein be described in detail particular implementations with the understanding that the present disclosure is to be considered as an exemplification of the principles of the disclosed methods and systems, and is not intended to limit the broad aspect of the disclosed concepts to the implementations illustrated.

In the following description, reference is made to the accompanying drawings which form a part hereof, and which show by way of illustration possible implementations. It is to be understood that other implementations may be utilized, and structural, as well as procedural, changes may be made without departing from the scope of this document.

As a matter of convenience, various components will be described using exemplary materials, sizes, shapes, dimensions, and the like. However, this document is not limited to the stated examples and other configurations are possible and within the teachings of the present disclosure. As will become apparent, changes may be made in the function and/or arrangement of any of the elements described in the disclosed exemplary implementations without departing from the spirit and scope of this disclosure.

As will be described in more detail below, the enclosed garden bed system 100 is designed to provide a healthy environment for plant growth while protecting the plants from typical threats, such as pests and the climate. The enclosed garden bed system 100 may comprise a garden bed 101 and an enclosure 105. The garden bed 101 may have a garden bed framework 102 and a container 104 and the enclosure 105 may have a net enclosure framework 106 and a netting material 108. As illustrated in FIG. 1, the garden bed framework 102 has a first plurality of members 110 and a first plurality of member connectors 112. The plurality of members 110 may be anything commonly used as a structural component. For example, the plurality of members 110 may be a plurality of beams, pipes, bars, rods, poles, shafts, posts, and the like. Each member 110 of the first plurality of members 110 is joined to the other members 110 by the first plurality of member connectors 112. Each member connector 112 is capable of receiving multiple members 110. For example, as shown in FIG. 1, the member connectors 112 may receive three or four members 110, with each member 110 extending away from the member connector 112 in a different direction. The first plurality of member connectors 112 may each form a corner of the garden bed framework 102. In addition, the garden bed framework 102 may form any shape. For example, FIG. 1 illustrates a garden bed framework 102 having a cubic shape. In such an embodiment, the first plurality of members 110 may comprise four top members 114, four vertical support members 116, and four bottom members 118. The four top members 114 are connected by top corners on a top 120 of the garden bed framework 102, the four vertical support members 116 are spaced around a side 122 of the garden bed framework 102, and the four bottom members 118 surround a bottom 124 of the garden bed framework 102. Alternatively, the four bottom members 118 may be excluded, with the four vertical support members 116 having ends which define the bottom corners of the cubic shape (not shown). The horizontal cross-sectional shape of the garden bed framework 102 may be any other geometric shape, such as a hexagon or a circle, or may be any irregular shape.

Figure 2:
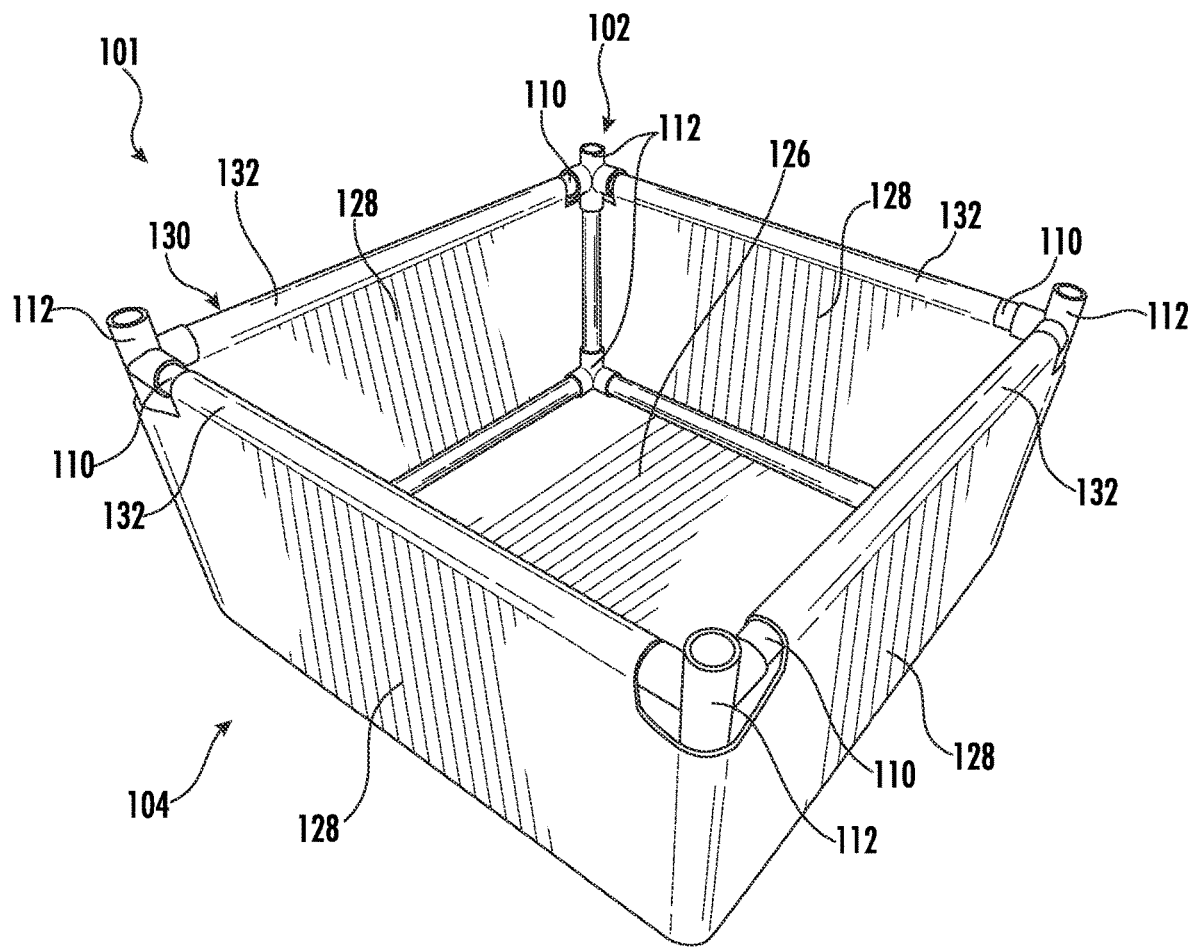
FIG. 2 is a perspective view of the garden bed, with the garden bed framework of FIG. 1 installed in the container.

The container 104 may have a base 126 and a plurality of sides 128, as shown in FIG. 2. In a particular embodiment, the container 104 may have four sides 128. Each of the plurality of sides 128 may have a top edge 130 with a sleeve 132 configured to receive a member 110. The garden bed framework 102 sits within the container 104 to form the garden bed 101, and the top members 118 each extend through one of the sleeves 132. Thus, for embodiments of the container 104 which are not made of a rigid material, the sleeves 132 hold the top edges 130 and keep the container 104 in a configuration surrounding the garden bed framework 102. The container 104 may be made of a breathable non-woven fabric. Such a fabric promotes faster plant growth through aeration of the soil within the container 104. In addition, the fabric provides superior drainage for the soil, resulting in healthier plants.

Figure 3:
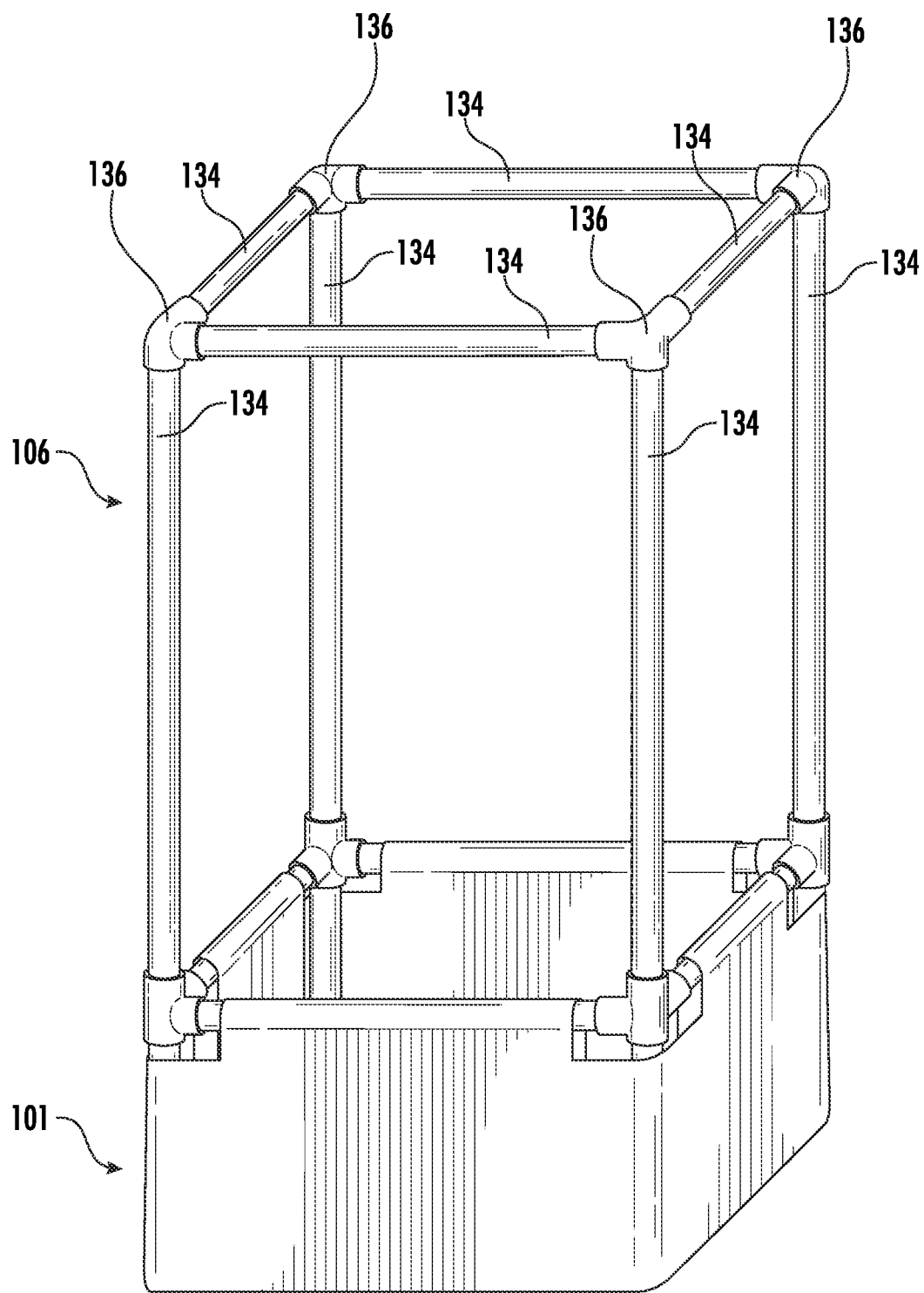
FIG. 3 is a perspective view of an embodiment of the net enclosure framework installed on the garden bed shown in FIG. 2.

As shown in FIG. 3, the net enclosure framework 106 has a second plurality of members 134 and a second plurality of member connectors 136. The net enclosure framework 106 may be coupled to the garden bed 101 by inserting the ends of a portion of the members 134 into the member connectors 112 on the top 120 of the garden bed framework 102. The second plurality of members 134 and the second plurality of member connectors 136 function together largely the same as the first plurality of members 110 and the first plurality of member connectors 112. For example, each of the second plurality of member connectors 136 may form a corner of the net enclosure framework 106. The horizontal cross-sectional shape of the net enclosure framework 106 may match the horizontal cross-sectional shape of the garden bed framework 102. The plurality of members 134 join together with the plurality of member connectors 136 to form the enclosure 105.

Figure 4A:
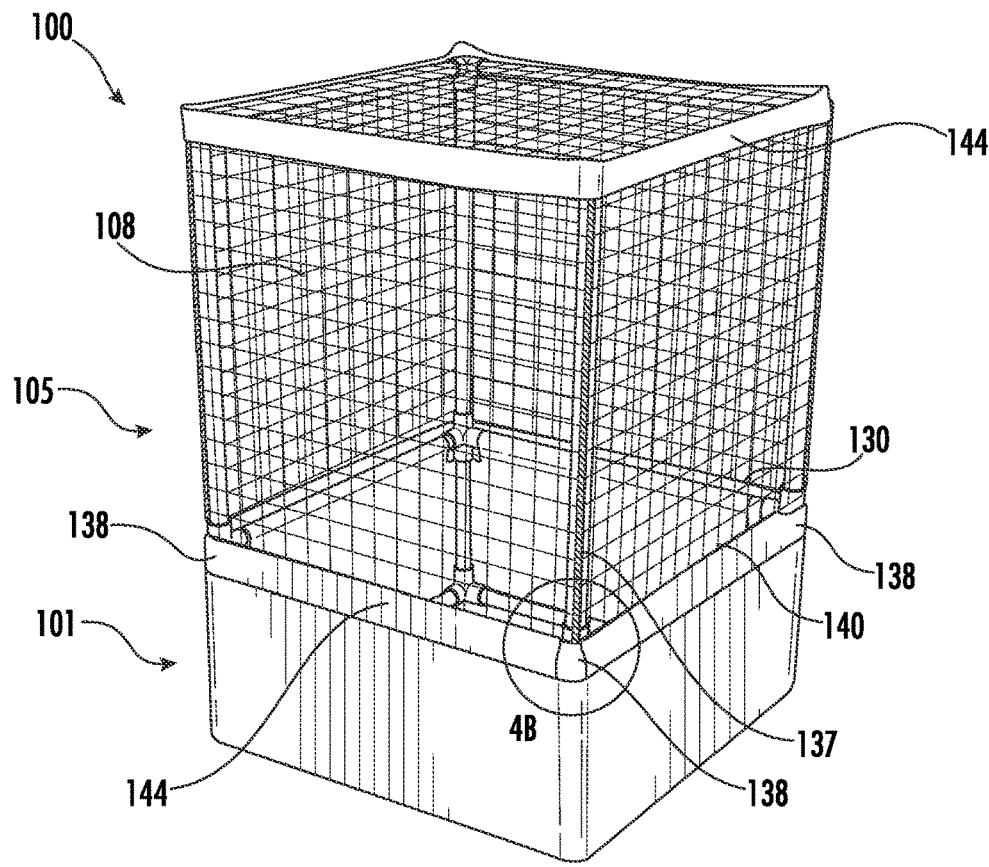
FIG. 4A is a perspective view of an embodiment of an enclosed garden bed system.
Figure 4B:
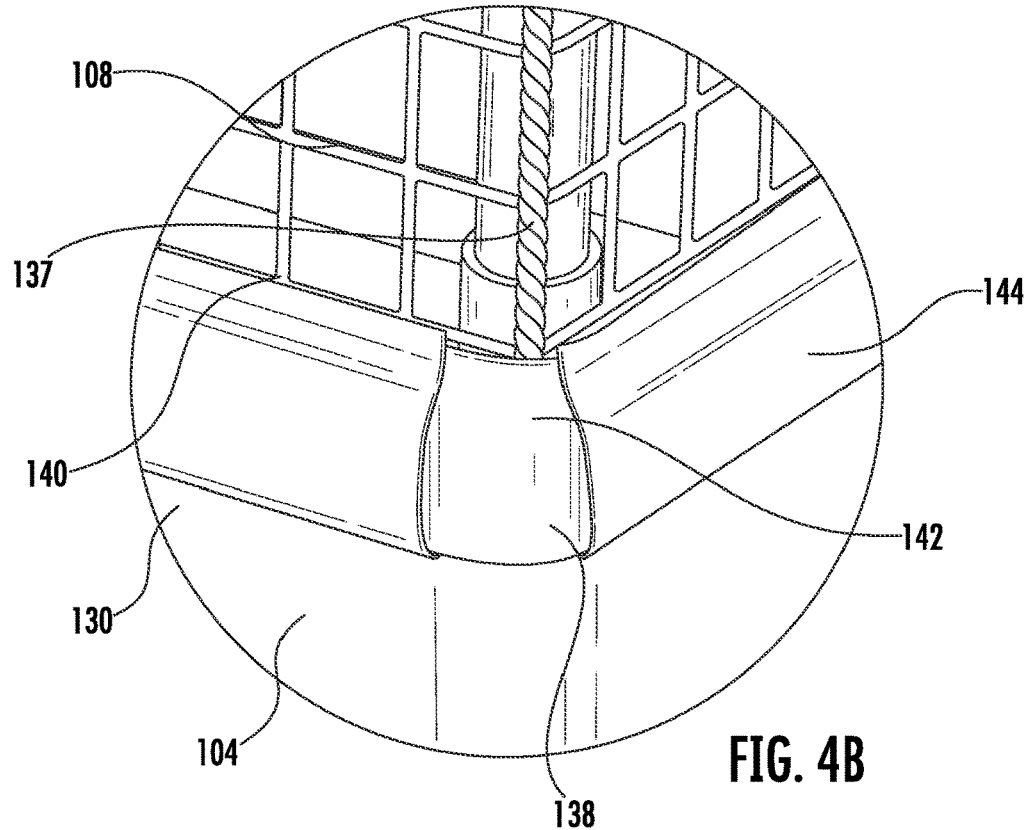
FIG. 4B is a close up view of the elastic material of the enclosed garden bed system shown in FIG. 4A, taken from circle 4B.

FIG. 4A illustrates one embodiment of a complete enclosed garden bed system 100. The netting material 108 wraps around and over a portion of the net enclosure framework 106 to form the enclosure 105. The netting material 108 may comprise polyethylene and/or an ultraviolet (UV) resistant material. In addition, the netting material 108 may comprise a plurality of panels sewn together with a rope 137. The rope 137 may be a nylon material, a polyethylene material, or some other material. The netting material 108 has a plurality of lower corners 138 along a lower edge 140 of the netting material 108. When the netting material 108 is placed over the net enclosure framework 106, the lower corners 138 are adjacent the top edge 130 of the container 104. In embodiments without a container 104 or garden bed framework 102, the lower corners 138 are adjacent the surface on which the net enclosure framework 106 rests. Each of the lower corners 138 comprises an elastic material 142, as shown in FIG. 4B, configured to stretch when the netting material 108 is placed over the net enclosure framework 106. The elastic material 142 helps facilitate placement of the netting material 108 over the enclosed garden bed system 100 by giving the netting material 108 a range of possible dimensions. The netting material 108 can be stretched to a dimension larger than the net enclosure framework 106, moved to the desired position for the netting material 108, and then released in that position. The elastic material 142 tightens the netting material 108 in place, thus helping maintain the netting material 108 in the desired position.

Figure 5:
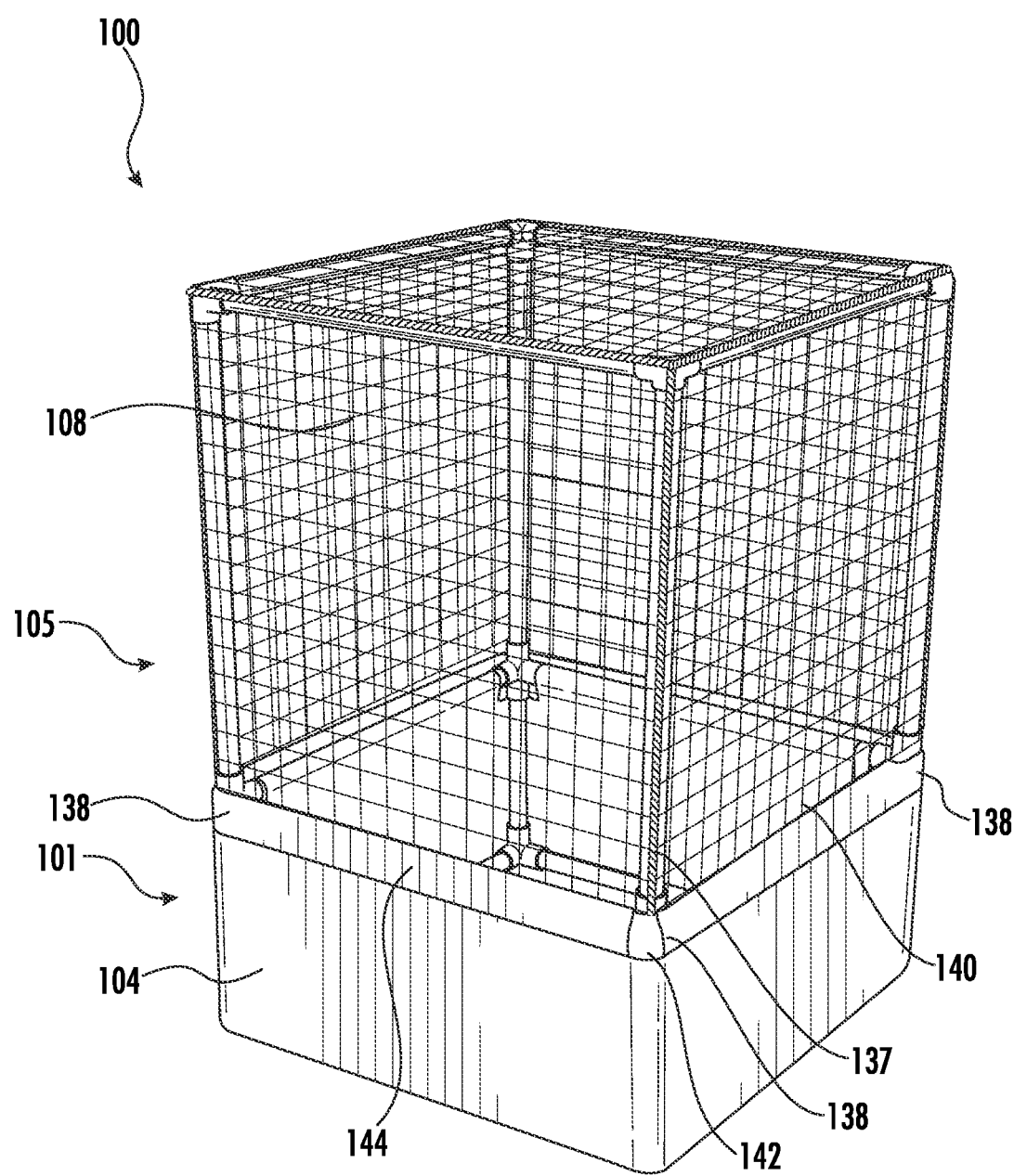
FIG. 5 is a perspective view of another embodiment of the enclosed garden bed system.

The netting material 108 is configured to protect plants within the container 104. For example, the netting material 108 may be configured to deter pests such as birds, rodents, or insects from entering into the enclosed garden bed system 100. Alternatively, the netting material 108 may be a shade cover configured to protect the plants from the sun or a frost protection cover configured to protect the plants from frost. The netting material 108 may also have a strip 144 extending horizontally between each of the lower corners 138 of the netting material 108. The strip 144 is adjacent the top edges 130 of the container 104 and overlaps with the netting material 108 and the top edges 130 of the container 104. This helps to limit the ability of pests to enter the enclosed garden bed system 100. The strip 144 may also extend around the top edge of the net enclosure framework 106, as illustrated in FIG. 4A. An embodiment of the enclosed garden bed system 100 without the strip 144 around the top edge of the net enclosure framework 106 is illustrated in FIG. 5.

Figure 6:
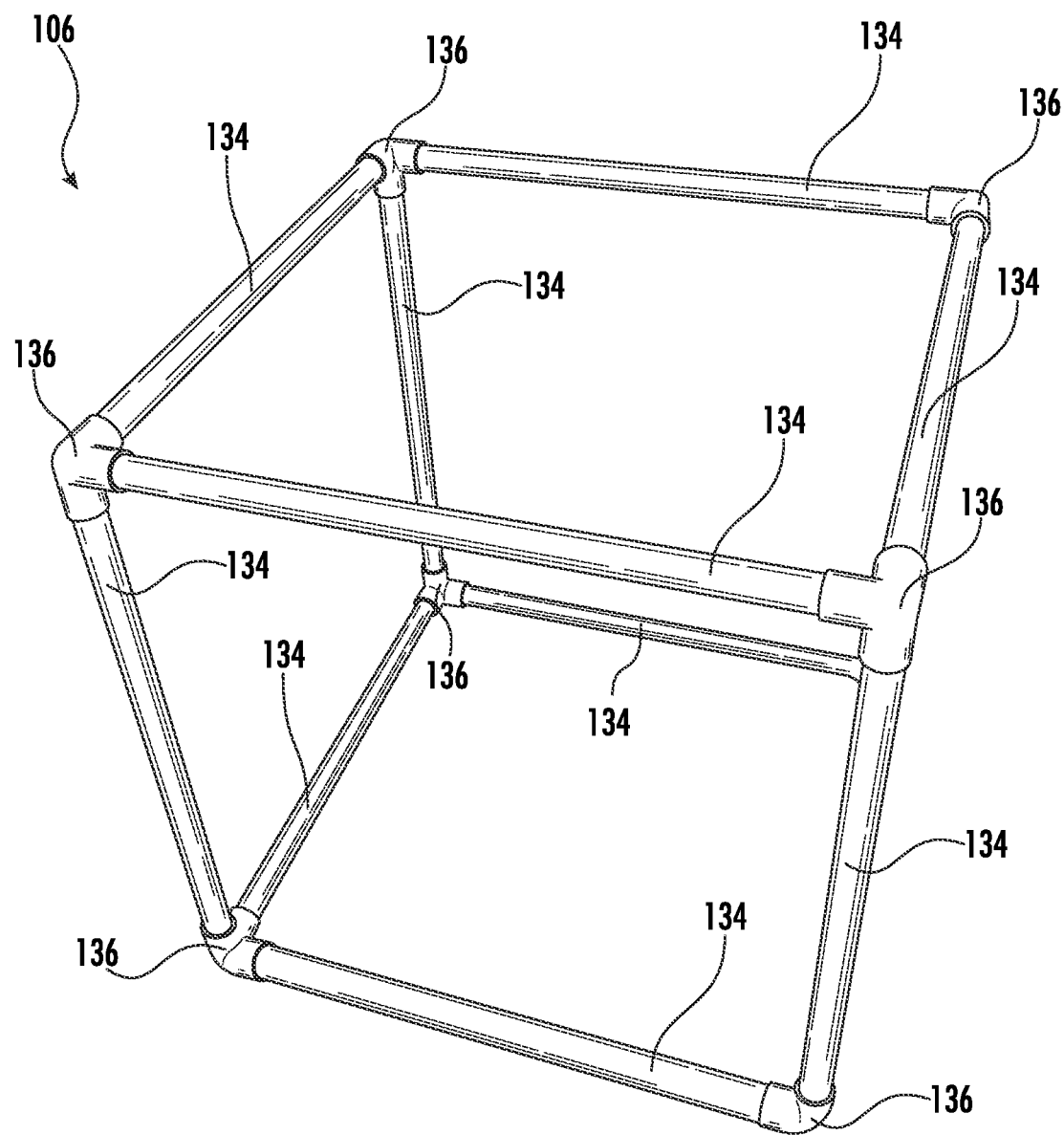
FIG. 6 is a perspective view of another embodiment of the enclosed garden bed system without a netting material.
Figure 7:
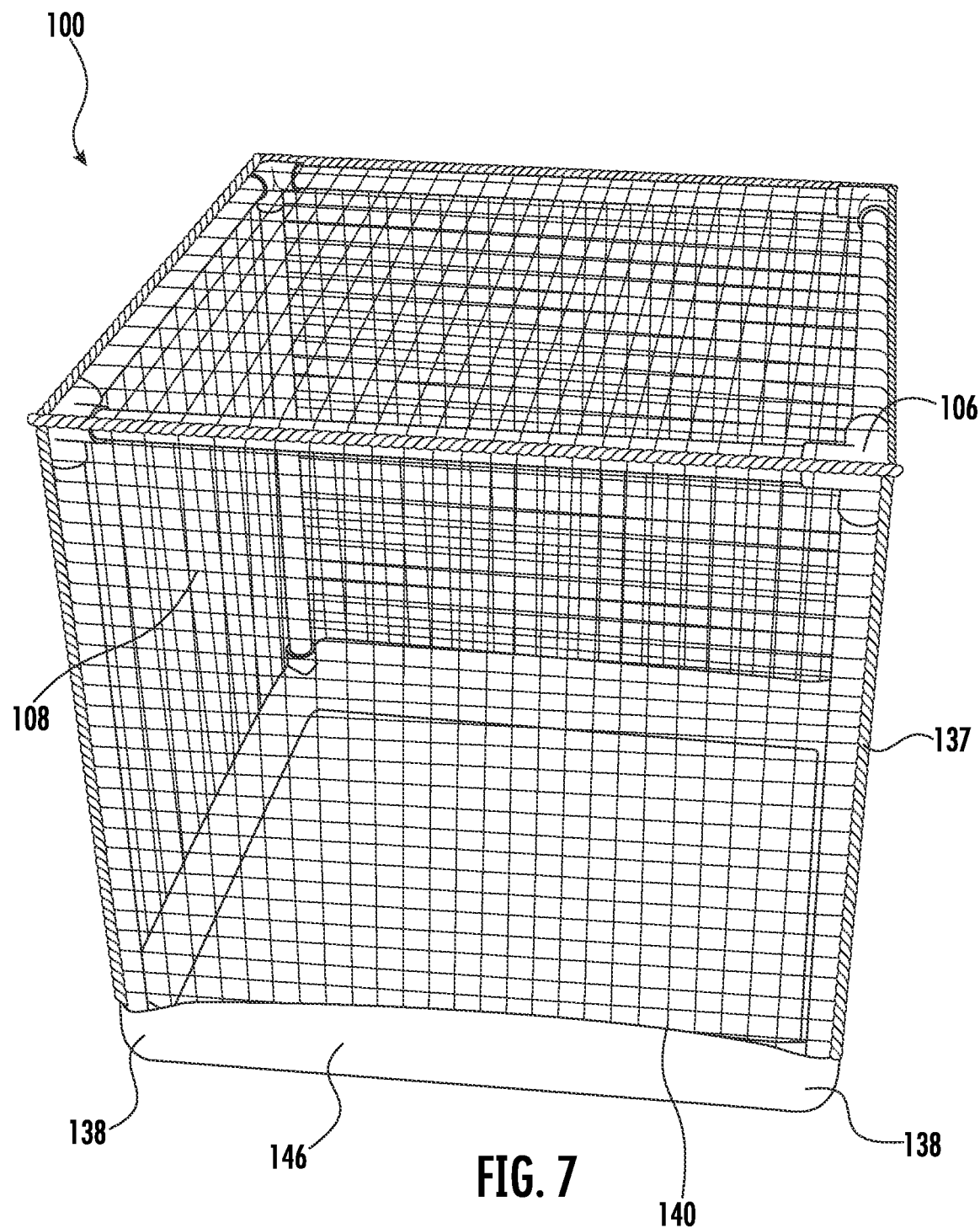
FIG. 7 is a perspective view of the enclosed garden bed system shown in FIG. 6 with the netting material.
Figure 8:
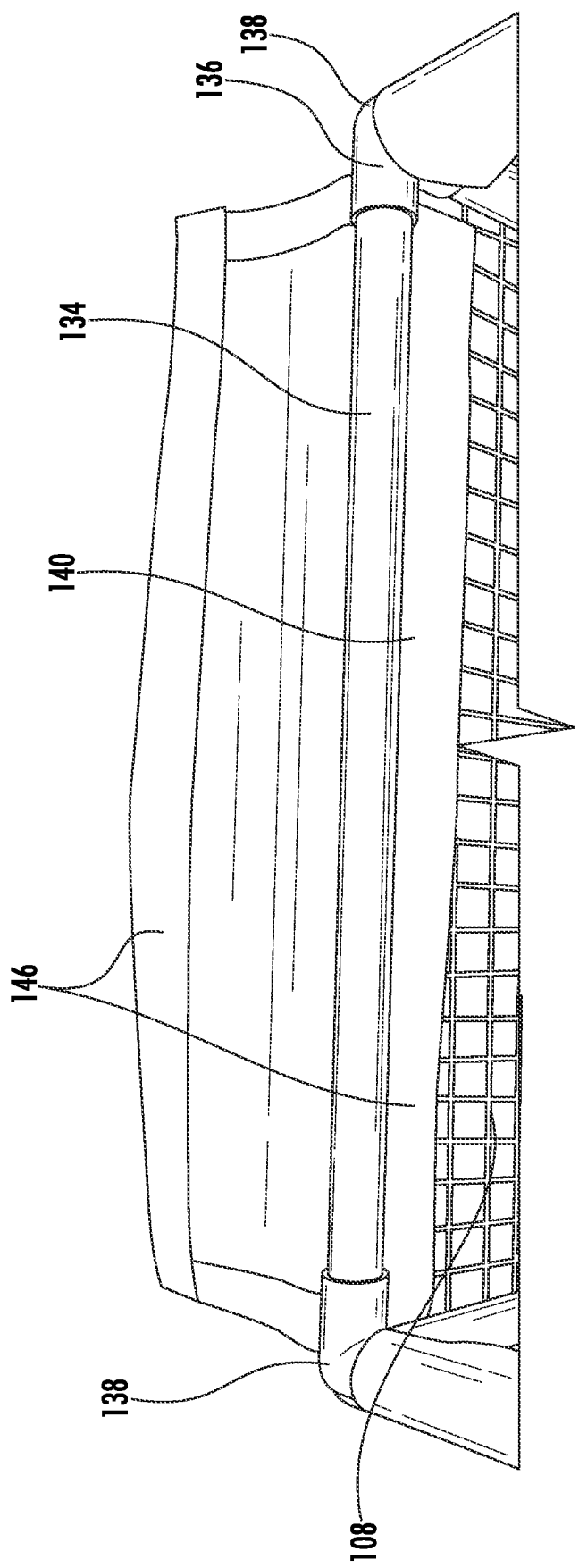
FIG. 8 is a close up view of the enclosed garden bed system of FIG. 7, showing one embodiment for how to couple the netting material with the net enclosure framework.

FIGS. 6 and 7 illustrate an embodiment of the enclosed garden bed system 100 which does not have a garden bed 101 with the garden bed framework 102 or the container 104. In such an embodiment, the netting material 108 may have a fastener 146 configured to couple the lower edges 140 to the net enclosure framework 106. In some embodiments, a hook and loop material may be used, as shown in FIG. 8. In such an embodiment, the plurality of lower edges 140 wrap around a member 134 and then couple to the hook and loop material to hold the netting material 108 to the net enclosure framework 106. The embodiment shown in FIGS. 6 and 7 may be useful for protecting plants growing in the ground or in a container which is not configured to couple with the net enclosure framework 106.

It will be understood that implementations of an enclosed garden bed system are not limited to the specific assemblies, devices and components disclosed in this document, as virtually any assemblies, devices and components consistent with the intended operation of an enclosed garden bed system may be used. Accordingly, for example, although particular enclosed garden bed systems, and other assemblies, devices and components are disclosed, such may include any shape, size, style, type, model, version, class, measurement, concentration, material, weight, quantity, and/or the like consistent with the intended operation of enclosed garden bed systems. Implementations are not limited to uses of any specific assemblies, devices and components; provided that the assemblies, devices and components selected are consistent with the intended operation of an enclosed garden bed system.

Accordingly, the components defining any enclosed garden bed system implementations may be formed of any of many different types of materials or combinations thereof that can readily be formed into shaped objects provided that the components selected are consistent with the intended operation of an enclosed garden bed system implementation. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, nickel, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof. In instances where a part, component, feature, or element is governed by a standard, rule, code, or other requirement, the part may be made in accordance with, and to comply under such standard, rule, code, or other requirement.

Various enclosed garden bed systems may be manufactured using conventional procedures as added to and improved upon through the procedures described here. Some components defining an enclosed garden bed system may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that enclosed garden bed systems are not limited to the specific order of steps as disclosed in this document. Any steps or sequence of steps of the assembly of an enclosed garden bed system indicated herein are given as examples of possible steps or sequence of steps and not as limitations, since various assembly processes and sequences of steps may be used to assemble enclosed garden bed systems.

The implementations of an enclosed garden bed system described are by way of example or explanation and not by way of limitation. Rather, any description relating to the foregoing is for the exemplary purposes of this disclosure, and implementations may also be used with similar results for a variety of other applications employing an enclosed garden bed system.

What is claimed is:

1. An enclosed garden bed system, comprising:
a garden bed framework having a first plurality of members joined together by a first plurality of member connectors, each of the first plurality of member connectors forming a corner of the garden bed framework, wherein the first plurality of members comprises four top members connected by top corners on a top of the garden bed framework, four vertical support members around a side of the garden bed framework, and four bottom members on a bottom of the garden bed framework, and wherein the garden bed framework has a cubic shape;
a container having a base and four sides, each of the four sides having a top edge with a sleeve configured to receive a member, wherein the garden bed framework sits inside of the container with each of the top members extending through one of the sleeves, and wherein the container is made of a breathable non-woven fabric;
a net enclosure framework coupled to the top of the garden bed framework and having a second plurality of members joined together by a second plurality of member connectors, each of the second plurality of member connectors forming a corner of the net enclosure framework, wherein a horizontal cross-sectional shape of the net enclosure framework matches a horizontal cross-sectional shape of the garden bed framework;
a netting material wrapped around and over a portion of the net enclosure framework, wherein the netting material comprises polyethylene and is configured to protect plants planted within the container, wherein the netting material has a plurality of lower corners along a lower edge of the netting material adjacent the top corners of the garden bed framework, and wherein each of the lower corners comprises an elastic material configured to stretch when the netting material is placed over the net enclosure framework; and
a plurality of strips each extending from one lower corner to another lower corner of the plurality of lower corners along the top edge of the container, wherein each strip overlaps with the netting material and the top edge of the container; and wherein a lower border of the netting material alternates between the strips and the elastic material.

2. The enclosed garden bed system of claim 1, wherein the netting material is a shade cover configured to protect the plants from the sun.

3. An enclosed garden bed system, comprising:
a garden bed framework having a first plurality of members joined together by a first plurality of member connectors, wherein the first plurality of members comprises a plurality of top members on a top of the garden bed framework and a plurality of vertical support members around a side of the garden bed framework;
a container having a base and a plurality of sides, each of the plurality of sides having a top edge with a sleeve configured to receive a member, wherein the garden bed framework sits inside of the container with each of the top members extending through one of the sleeves;
a net enclosure framework coupled to the top of the garden bed framework and having a second plurality of members joined together by a second plurality of member connectors to form an enclosure; and
a netting material wrapped around and over a portion of the net enclosure framework, wherein the netting material has a plurality of lower corners adjacent the plurality of top members of the garden bed framework, the plurality of lower corners comprising an elastic material configured to stretch when the netting material is placed over the net enclosure framework;
a plurality of strips each extending from one lower corner to another lower corner of the plurality of lower corners along the top edge of the container, wherein each strip overlaps with the netting material and the top edge of the container; and
wherein a lower border of the netting material alternates between the strips and the elastic material.

4. The enclosed garden bed system of claim 3, wherein the container is made of a breathable non-woven fabric.

5. The enclosed garden bed system of claim 3, wherein the netting material comprises a plurality of panels sewn together with at least one rope.

6. The enclosed garden bed system of claim 5, wherein the rope is a nylon material.

7. The enclosed garden bed system of claim 3, wherein the netting material is a shade cover configured to protect a plant within the enclosed garden bed system from the sun.

8. The enclosed garden bed system of claim 3, wherein the netting material is a frost protection cover configured to protect a plant within the enclosed garden bed system from frost.

9. An enclosed garden bed system, comprising:
a net enclosure framework having a plurality of members joined together by a plurality of member connectors to form an enclosure; and
a netting material wrapped around and over a portion of the net enclosure framework, wherein the netting material has a plurality of lower edges and a plurality of lower corners, wherein the plurality of lower edges each has a strip extending from one lower corner to another lower corner of the plurality of lower corners, the plurality of lower corners each comprises an elastic material configured to stretch when the netting material is placed over the net enclosure framework, and a lower border of the netting material alternates between the strips and the elastic material.

10. The enclosed garden bed system of claim 9, wherein the plurality of lower edges each has a fastener configured to couple to the plurality of lower edges to the net enclosure framework, the fastener is a hook and loop material, and each of the plurality of lower edges couples to the net enclosure framework by wrapping around a member of the plurality of members.

11. The enclosed garden bed system of claim 9, wherein the netting material is a UV resistant material.

12. The enclosed garden bed system of claim 9, wherein the netting material comprises a plurality of panels sewn together with at least one rope.

13. The enclosed garden bed system of claim 9, wherein the netting material is a shade cover configured to protect a plant within the enclosed garden bed system from the sun.

14. The enclosed garden bed system of claim 9, wherein the netting material is a frost protection cover configured to protect a plant within the enclosed garden bed system from frost.

15. The enclosed garden bed system of claim 1, wherein each of the plurality of strips is configured to deter pests from entering the enclosed garden bed system.

16. The enclosed garden bed system of claim 2, wherein each of the plurality of strips is configured to deter pests from entering the enclosed garden bed system.

17. The enclosed garden bed system of claim 9, wherein the strips are configured to deter pests from entering the enclosed garden bed system.

* * * * *